(12) United States Patent
Resnick et al.

(10) Patent No.: US 11,889,126 B2
(45) Date of Patent: Jan. 30, 2024

(54) SYSTEM AND METHOD FOR PROVIDING MEDIA THAT REPRESENTS A PORTION OF AN EVENT TO A PORTABLE SUBSCRIBER DEVICE

(71) Applicant: 15 Seconds of Fame, Inc., Santa Monica, CA (US)

(72) Inventors: Adam Resnick, Boca Raton, FL (US); Gregg Donnenfeld, Roslyn, NY (US); Michael Mackey, Boca Raton, FL (US); Ruslan Sabitov, Jersey City, NJ (US)

(73) Assignee: 15 Seconds of Fame, Inc., Santa Monica, CA (US)

( * ) Notice: Subject to any disclaimer, the term of this patent is extended or adjusted under 35 U.S.C. 154(b) by 78 days.

(21) Appl. No.: 17/745,955

(22) Filed: May 17, 2022

(65) Prior Publication Data

US 2022/0368956 A1 Nov. 17, 2022

Related U.S. Application Data

(60) Provisional application No. 63/189,407, filed on May 17, 2021.

(51) Int. Cl.
| | | |
|---|---|---|
| *H04N 21/2187* | (2011.01) | |
| *G06Q 10/02* | (2012.01) | |
| *H04W 4/021* | (2018.01) | |
| *H04W 8/18* | (2009.01) | |

(52) U.S. Cl.
CPC ......... *H04N 21/2187* (2013.01); *G06Q 10/02* (2013.01); *H04W 4/021* (2013.01); *H04W 8/18* (2013.01)

(58) Field of Classification Search
CPC ... H04N 21/2187; G06Q 10/02; H04W 4/021; H04W 8/18
See application file for complete search history.

(56) References Cited

U.S. PATENT DOCUMENTS

| | | |
|---|---|---|
| 7,562,051 B1 | 7/2009 | Donner |
| 7,697,922 B2 | 4/2010 | McQuaide, Jr. et al. |
| 7,945,935 B2 | 5/2011 | Stonedahl |
| 8,782,701 B2* | 7/2014 | Yu ..................... H04N 21/47214 725/39 |
| 9,386,355 B2 | 7/2016 | Packard et al. |
| 10,325,410 B1* | 6/2019 | Smith ..................... G06T 11/00 |
| 10,419,830 B2 | 9/2019 | Packard et al. |
| 2006/0104600 A1 | 5/2006 | Abrams |

(Continued)

OTHER PUBLICATIONS

International Search Report and Written Opinion of the International Searching Authority for International application No. PCT/US2022/029537 dated Aug. 8, 2022.

*Primary Examiner* — Nicholas T Corbo
(74) *Attorney, Agent, or Firm* — Carlson, Gaskey & Olds, P.C.

(57) ABSTRACT

An illustrative example embodiment of a method includes determining that at least one first condition is satisfied indicating that a subscriber is an event attendee, determining that at least one second condition is satisfied indicating that the subscriber is at least likely to desire observing media representing at least a portion of the event, and providing the media representing at least the portion of the event to a portable subscriber device based on the first condition and the second condition being satisfied.

12 Claims, 2 Drawing Sheets

(56) References Cited

U.S. PATENT DOCUMENTS

| | | | |
|---|---|---|---|
| 2011/0069940 A1* | 3/2011 | Shimy | H04N 21/42201 386/296 |
| 2012/0166955 A1 | 6/2012 | Bender | |
| 2014/0157307 A1 | 6/2014 | Cox | |
| 2015/0058730 A1 | 2/2015 | Dubin et al. | |
| 2016/0182930 A1* | 6/2016 | Ortiz | H04N 21/2387 725/25 |
| 2018/0365651 A1* | 12/2018 | Sreedhara | G06F 17/18 |
| 2020/0186958 A1* | 6/2020 | Husain | H04L 67/55 |
| 2023/0039015 A1* | 2/2023 | Liu | H04N 21/4223 |

* cited by examiner

SYSTEM AND METHOD FOR PROVIDING MEDIA THAT REPRESENTS A PORTION OF AN EVENT TO A PORTABLE SUBSCRIBER DEVICE

CROSS REFERENCE TO RELATED APPLICATION

This application claims priority to U.S. Provisional Application No. 63/189,407, filed on May 17, 2021.

BACKGROUND

People attend a wide variety of live entertainment events. Some examples include competitive sport events, concerts, and theatrical productions. There are a variety of circumstances that might interfere with a person's ability to observe or enjoy the entire event. For example, an individual's view may be obstructed by other people or a poor vantage point from the individual's seat at the venue hosting the event. There are also circumstances in which an individual cannot be present at an assigned seat location during some of the event and, therefore, may not be able to observe the entire event.

SUMMARY

An illustrative example embodiment of a method includes determining that at least one first condition is satisfied indicating that a subscriber is an event attendee, determining that at least one second condition is satisfied indicating that the subscriber is at least likely to desire observing media representing at least a portion of the event, and providing the media representing at least the portion of the event to a portable subscriber device based on the first condition and the second condition being satisfied.

In addition to one or more of the features described above, or as an alternative, determining that the first condition is satisfied includes at least one of determining that the subscriber has an attendance credential, receiving an indication that the subscriber has an attendance credential, or determining that the subscriber or the portable subscriber device is located within a predetermined distance of a venue hosting the event.

In addition to one or more of the features described above, or as an alternative, the event is one of a plurality of events in a season and determining that the first condition is satisfied includes determining that the subscriber is a season ticket holder.

In addition to one or more of the features described above, or as an alternative, determining that the second condition is satisfied includes at least one of determining that the subscriber is not in a reserved seat for the event or receiving an indication from the subscriber requesting the media.

In addition to one or more of the features described above, or as an alternative, determining that the subscriber is not in the reserved seat includes determining that a current location of the subscriber or the portable subscriber device is different than a location of the reserved seat and wherein the current location is within the venue or within the predetermined distance of the venue.

In addition to one or more of the features described above, or as an alternative, the second condition includes a current time being during the event, within a predetermined pre-event window of time, or within a predetermined post-event window of time.

In addition to one or more of the features described above, or as an alternative, receiving the indication from the subscriber is based on at least one of a compromised ability of the subscriber to observe the portion of the event, the subscriber missed the portion of the event, the subscriber desires to observe the portion of the event again, or the subscriber being outside of a venue hosting the event during the portion of the event.

In addition to one or more of the features described above, or as an alternative, the indication from the subscriber includes an indication or description of the portion of the event that the subscriber desires to be represented in the media.

In addition to one or more of the features described above, or as an alternative, providing the media representing at least the portion of the event includes at least one of streaming the media during a time when the second condition is satisfied or providing a segment of media corresponding to an interesting incident that occurred during the time when the second condition is satisfied.

In addition to one or more of the features described above, or as an alternative, the method includes presenting the subscriber with a selection that allows the subscriber to select at least one of a plurality of media respectively representing a plurality of incidents that occurred during the event, media representing each of a plurality of viewpoints from which to observe the portion of the event, or media representing each of a plurality of pre-planned incidents that are part of the event prior to the incidents occurring.

An illustrative example embodiment of a system includes a server including at least one processor and memory associated with the processor. The server is configured to determine that at least one first condition is satisfied indicating that a subscriber is an event attendee, determine that at least one second condition is satisfied indicating that the subscriber is at least likely to desire observing media representing at least a portion of the event, and prepare the media representing at least the portion of the event to be provided to a portable subscriber device based on the first condition and the second condition being satisfied.

In addition to one or more of the features described above, the server is configured to determine that the first condition is satisfied by at least one of determining that the subscriber has an attendance credential, receiving an indication that the subscriber has an attendance credential, or determining that the subscriber or the portable subscriber device is located within a predetermined distance of a venue hosting the event.

In addition to one or more of the features described above, the event is one of a plurality of events in a season and the server is configured to determine that the first condition is satisfied by determining that the subscriber is a season ticket holder.

In addition to one or more of the features described above, the server is configured to determine that the second condition is satisfied by at least one of determining that the subscriber is not in a reserved seat for the event or receiving an indication from the subscriber requesting the media.

In addition to one or more of the features described above, the server is configured to determine that the subscriber is not in the reserved seat by determining that a current location of the subscriber or the portable subscriber device is different than a location of the reserved seat and the current location is within the venue or within the predetermined distance of the venue.

In addition to one or more of the features described above, the second condition includes a current time being during the event, within a predetermined pre-event window of time, or within a predetermined post-event window of time.

In addition to one or more of the features described above, receiving the indication from the subscriber is based on at least one of a compromised ability of the subscriber to observe the portion of the event, the subscriber missed the portion of the event, the subscriber desires to observe the portion of the event again, or the subscriber is outside of a venue hosting the event during the portion of the event.

In addition to one or more of the features described above, the indication from the subscriber includes an indication or description of the portion of the event that the subscriber desires to be represented in the media.

In addition to one or more of the features described above, the system includes at least one communication node and the server is configured to provide the media representing at least the portion of the event through the communication node by at least one of streaming the media during a time when the second condition is satisfied or providing a segment of media corresponding to an interesting incident that occurred during the time when the second condition is satisfied.

In addition to one or more of the features described above, the server is configured to present the subscriber with a selection that allows the subscriber to select at least one of a plurality of media respectively representing a plurality of incidents that occurred during the event, media representing each of a plurality of viewpoints from which to observe the portion of the event, or media representing each of a plurality of pre-planned incidents that are part of the event prior to the incidents occurring.

The various features and advantages of at least one example embodiment will become apparent to those skilled in the art from the following detailed description. The drawings that accompany the detailed description can be briefly described as follows.

DETAILED DESCRIPTION

Figure 1:
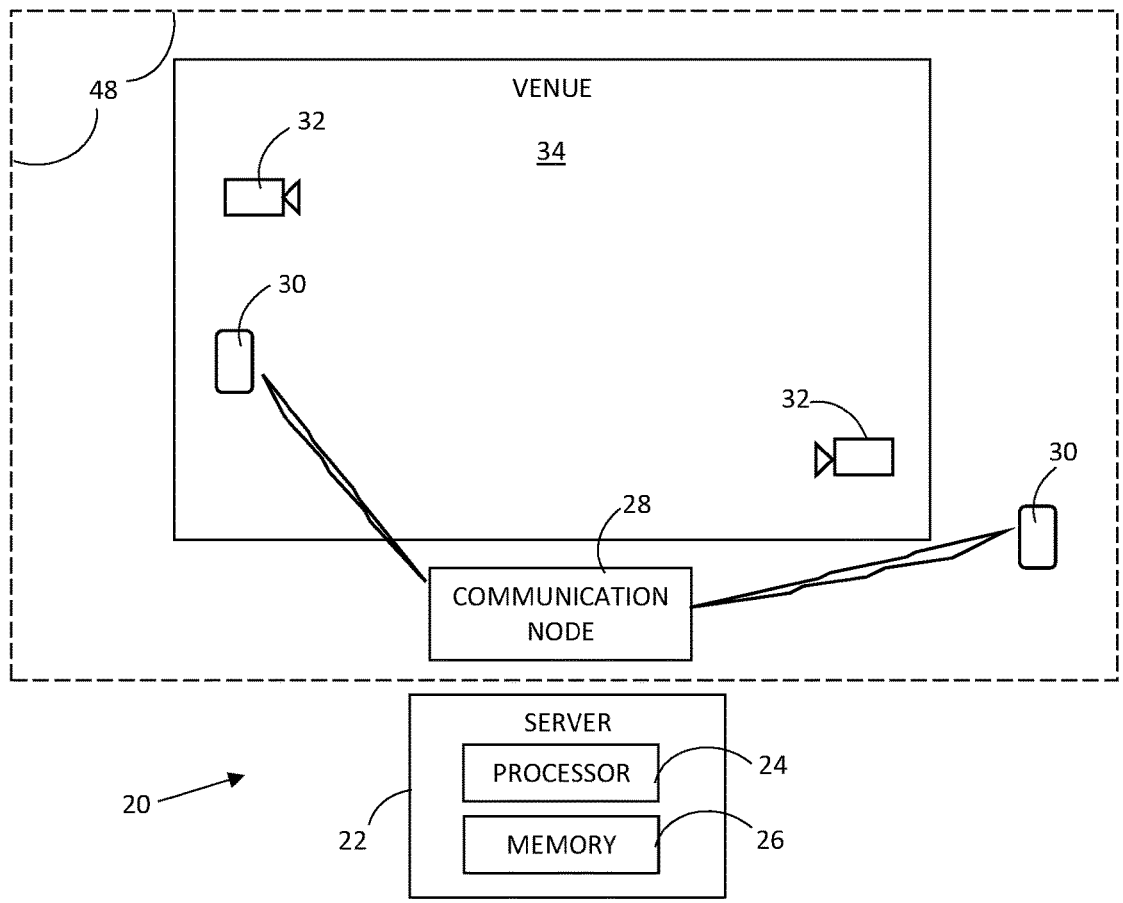
FIG. 1 schematically illustrates selected portions of a system for providing media representing at least a portion of an event to portable subscriber devices.

FIG. 1 schematically illustrates a system 20 for providing media representing a portion of an event to at least one individual. For discussion purposes, the individual is described as a subscriber to a service that provides such media but a specific or formal subscription agreement may not be required in some embodiments.

A server 22 includes at least one computing device having a processor 24 and associated memory 26. In the illustrated example embodiment, the memory 26 includes a non-transitory storage medium that contains instructions that are executable by the processor 24 to realize the functions of the server 22 included in this description.

The server 22 communicates with a communication node 28 that is capable of communicating with other devices that are remote from the server 22, such as portable subscriber devices 30. In some embodiments, the portable subscriber devices 30 are mobile stations, such as smartphones, that use known wireless communication techniques for communicating with the server 22 through the communication node 28. In some embodiments, each portable subscriber device 30 includes an application that facilitates communications between the server 22 and the device 30. The portable subscriber devices 30 produce at least one of audio and video output based on data or media received by the portable subscriber device 30 from the server 22.

A plurality of media capturing devices 32 each include a camera and a microphone for capturing visible and audible media content during the course of an event that is hosted at a venue 34. Only two such device 32 are illustrated for discussion purposes. Any number of media capturing devices 32 may be used to meet the needs of a particular situation.

The server 22 is configured to determine when a subscriber is likely to desire media representing at least a portion of the event to be observable on the subscriber's portable device 30, to obtain media content from at least one of the media capturing devices 32 representing that portion of the event, and to provide media representing that portion of the event to the corresponding portable subscriber device 30.

FIG. 1 is schematically illustrative in nature and should not be considered limiting. For example, the server 22 is schematically illustrated as if it were a single device but that is not a requirement. The processor 24 and memory 26 may be part of a single machine or part of separate devices or components. Some embodiments of the system 20 include a plurality of devices that collectively function as the server 22. In some embodiments, at least some of the server 22 is hosted on at least one virtual machine in a cloud computing network. The server 22 may be located at the venue 34 or be at another location remote from the venue 34.

The communication node 28 may be at least part of a cellular communication base station or a wireless communication network access point that is situated in or near the venue 34. Only one communication node 28 and only two portable subscriber devices 30 are illustrated for discussion purposes. There may be several communication nodes 28 and many subscriber devices 30. Those skilled in the art who have the benefit of this description will realize what combination of equipment, components, hardware, software, and firmware will meet the needs of their particular implementation.

Figure 2:
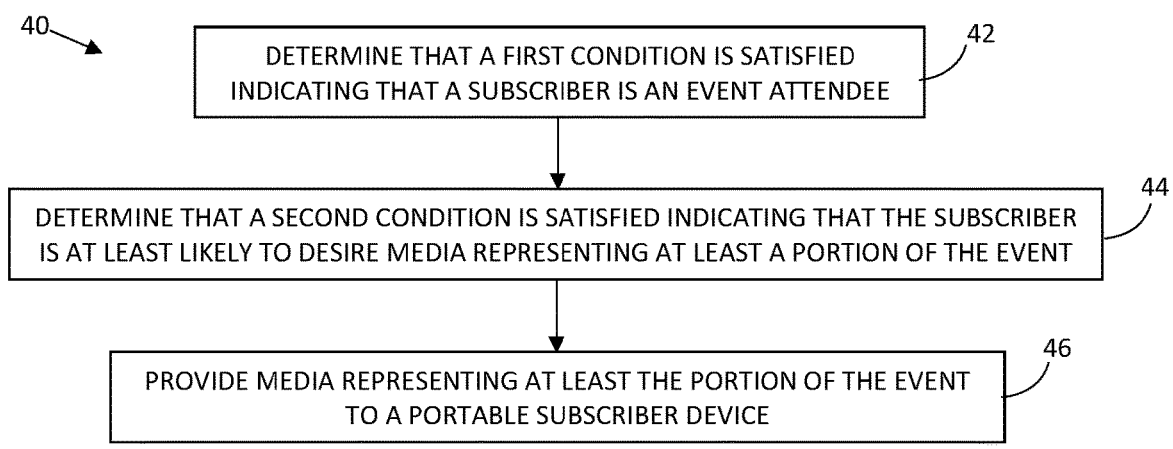
FIG. 2 is a flow chart diagram summarizing an example embodiment of a method of providing media representing a portion of an event to a portable subscriber device.

FIG. 2 is a flowchart diagram 40 that summarizes an example method of providing media representing at least a portion of an event to at least one subscriber on a portable subscriber device 30. For discussion purposes, the event is a live entertainment event hosted at the venue 34 that may be attended by a plurality of attendees but only one subscriber will be considered in the following description.

At 42, the server 22 determines that at least one first condition is satisfied indicating that the subscriber is an event attendee. At 44, the server 22 determines that at least one second condition is satisfied indicating that the subscriber is at least likely to desire observing media representing at least a portion of the event. The server 22 provides the media representing at least the portion of the event to the portable subscriber device 30 of the event attendee subscriber at 46 when the first condition and the second condition are satisfied.

The term "event attendee" as used in this description does not require the individual event attendee to be physically present within the venue 34. It is possible to consider a subscriber to be an event attendee when the subscriber has a valid attendance credential but has not yet entered the venue 34 or has left the venue 34 before the conclusion of the event.

The first condition indicating that the subscriber is an event attendee may include a single criterion or be based on a plurality of criteria. For example, the first condition includes a criterion that the subscriber have an attendance credential that is needed to gain admission to the venue 34. The attendance credential is not limited to any particular format or item. Example attendance credentials include, a ticket, pass, a quick response (QR) code, or a bar code, each of which may be a physical item or stored electronically on the portable subscriber device 30. The server 22 may determine that the subscriber has a valid attendance credential based on a communication from any one or more of the subscriber, a seller or provider of the credential, the venue hosting the event, or an organization owning rights to the event. Such a communication may include, for example, an electronic receipt evidencing purchase of the credential.

Some embodiments include allowing the subscriber to send an image of the credential to the server 22 using a camera that is part of the portable subscriber device 30. In some such embodiments, the image includes the face of the subscriber and the processor 24 uses facial recognition techniques to associate the subscriber with the attendance credential.

Another embodiment includes notifying the server 22 that the subscriber has presented the attendance credential at the venue 34, which may include providing an image of the subscriber's face for facial recognition purposes.

Another example criterion that is useful to determine whether the first condition is satisfied in some embodiments is a current location of the subscriber or the portable subscriber device 30. For example, the communication node 28 may detect the presence of the portable subscriber device 30 within the venue 34 or within a predetermined vicinity 48 outside of the venue 34. The vicinity 48 is only schematically illustrated in FIG. 1 and may extend over a geographic region of varying shape or size.

Locating the portable subscriber device 30 in or near the venue 34 provides an indication that the subscriber can be considered an attendee of the event. There are known techniques for determining a location of a wireless communication device or mobile station. Some embodiments include such known techniques for determining the current location of the portable subscriber device. Including the vicinity or area 48 outside the venue 34 allows event attendees to have the benefits of the system 20 while they are travelling to the event, tail gaiting outside the venue 34, or leaving the venue 34 before the event has concluded. In other words, a subscriber may be considered an event attendee even while the subscriber is not within the venue 34 or not physically in attendance at the event, provided that at least one criterion satisfying the first condition exists.

In some embodiments, the event attendee uses the portable subscriber device 30 to send an indication that the event attendee has arrived at, is nearby, or is traveling to the venue 34. Such an indication is another example criterion useful to determine whether the first condition is satisfied in some embodiments.

The first condition is satisfied in some example embodiments when the server 22 receives a combination of indications that the subscriber has a valid access credential to the event and that the subscriber or the subscriber's portable device 30 is within the vicinity 48 or the venue 34.

In some embodiments, when the event is one of a plurality of events in a season of events and the subscriber is a season ticket holder, the server 22 automatically determines that the first condition is satisfied for that subscriber for every event during that season without requiring any further communication or confirmation. Some venue operators or owners of rights in the event, such as a professional sport team or league, may offer a subscription to use of the system 20 as part of a season ticket package, which can server as an incentive to purchase season tickets, for example.

Figure 3:
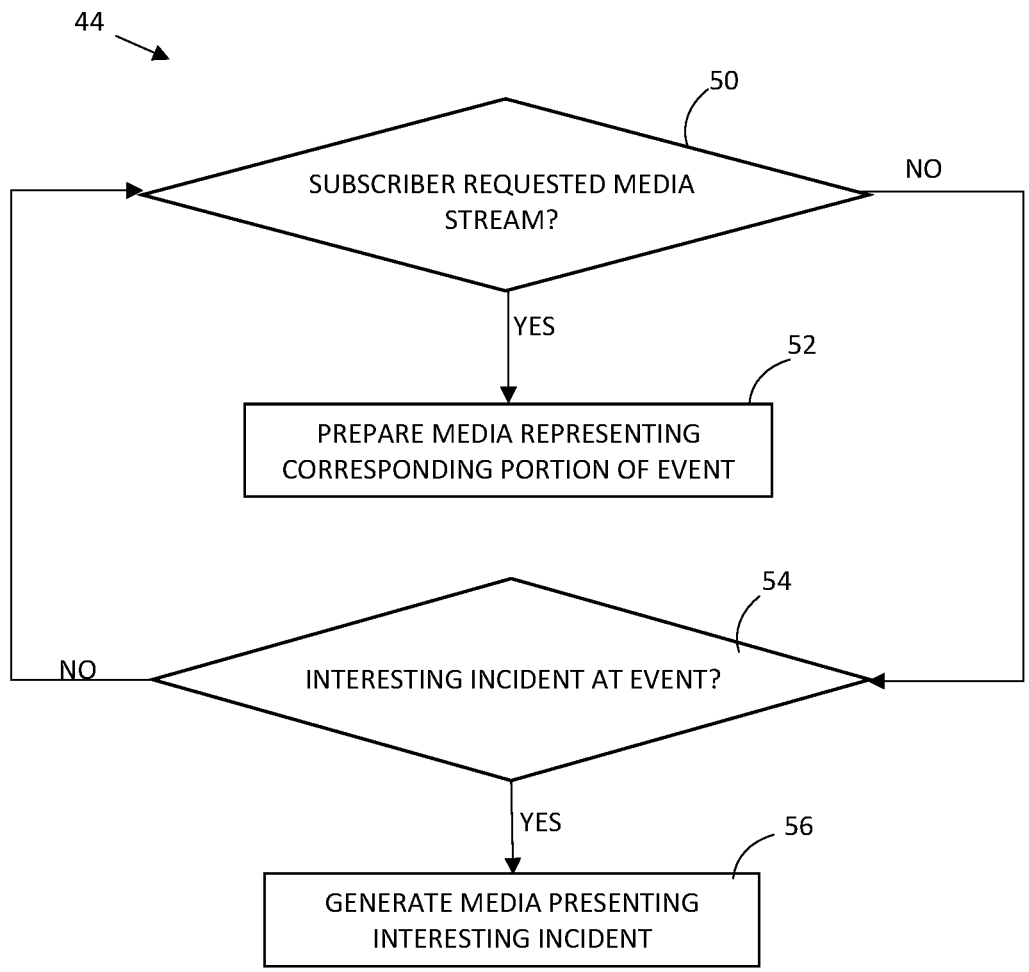
FIG. 3 is a flow chart diagram showing additional detail of a portion of the method shown in FIG. 2 according to one example embodiment.

FIG. 3 is a flowchart summarizing an example procedure for determining whether the second condition is met at 44. In this example, there are several scenarios in which an event attendee can receive media representing at least a portion of the event. Not all of the disclosed possibilities need to be available to the event attendee. In some embodiments a subset, or even just one, of the possible scenarios is available to at least some subscribers.

At 50, the server 22 determines whether the subscriber, who has already been identified as an event attendee at 42 (in FIG. 2), has requested a media stream representing at least a portion of the event. The server may make this determination based on a request received from the portable subscriber device 30 during the event. Such a request is enough to satisfy the second condition in some embodiments.

Once the server 22 determines at 50 that a media stream has been requested, the server prepares the media stream at 52. In some embodiments, the server 22 selects the content or format of the media stream prepared at 52 without further input from the event attendee. In some embodiments, the event attendee has the ability to customize the content or nature of the media prepared at 52. In either instance, the media stream may be an ongoing live stream of the portion of the event as it occurs or may be a recorded replay of a portion of the event that previously occurred.

In some embodiments, the event attendee has the ability to select a specific portion of the event or a particular vantage point from which to observe the event through the media stream. In some examples, the server 22 is configured to present the event attendee with a menu of selections representing different portions of the event or different vantage points on an interface on the portable subscriber device 30. The event attendee can customize the content of the media provided by the server 22 in such embodiments. The memory 26 in some embodiments includes subscriber profiles that indicate, for example, characteristics of media that each subscriber prefers.

Requesting the media stream allows the event attendee to observe a portion of the event that may not be visible to the event attendee because of the event attendee's position within or outside of the venue 34 while the portion of the event occurs. For example, the event attendee may desire to use a restroom or purchase concessions during the event and have to move away from a position, such as a seat or spot in a general admission or standing-room-only area, where the event attendee could have observed the event. Similarly, the event attendee may have not yet entered the venue 34 or have left the venue 34 at least temporarily. While the event attendee is in a position from which the event attendee cannot directly observe the event, the requested media stream allows the event attendee to avoid missing the corresponding portion of the event.

Requesting the vantage point allows the event attendee to observe a portion of the event that is not readily visible to the event attendee even while remaining in an assigned seat or a spot in a general admission area. Some events and some venues make it impossible for the event attendee to see all incidents or activities during the event from a single position within the venue 34. For example, track and field (or gymnastics) competitions include a variety of activities that occur at different locations within the venue 34. An event attendee may be in a position that includes a good view of the finish line for the 100 meter dash (or the balance beam) but not be able to see the pole vault (or parallel bars), for example, because the locations within the venue 34 assigned for those activities are so far apart that the event attendee cannot directly observe both. In another example, an event attendee may be seated near one end zone of a football stadium and unable to get a good view of a goal-line stance at the opposite end of the field. Another example event that inherently makes it difficult for an event attendee to see the entire event from a single position is a golf tournament.

The server 22 provides the event attendee with the ability to select a particular activity or vantage point to enhance the event attendee's experience at the event. The server 22 in some embodiments is configured to respond to a request from the event attendee as the event is occurring. In some embodiments, when an event has scheduled or distinct activities, such as a track and field (or gymnastics) competition, the event attendee may preset media stream requests prior to attending the event based on knowing which activities are of interest and will not be directly observable from the position the event attendee will be in during the event.

Another scenario in which an event attendee may request the media stream includes an obstructed view. For example, the event attendee may not be able to see the event well because of the size or position of other individuals near the event attendee. Additionally, some venues include seats or viewing areas that have structural features that hinder an attendee's view of at least some areas within that venue. Requesting the media stream allows the event attendee to avoid missing out on any portion of the event that occurred at a time or in a location that resulted in the event attendee's view being obstructed.

The example illustrated embodiment includes determining that the second condition is satisfied even though the event attendee has not actively requested a media stream. When the server 22 determines that no request has been made at 50, the server 22 determines at 54 whether an interesting incident occurred during the event. The interesting incident may be a highlight occurrence during the event or something that otherwise occurs in the venue. There are known techniques for determining when an incident during an event would be considered a highlight. For example, monitoring crowd noise, facial expressions, or physical responses of attendees allows for determining that a highlight of the event has occurred. The server 22 in some embodiments of the system 20 utilizes data from the media capture devices 34 and a known technique to make the determination at 54.

Assuming that nothing notable or of particular interest has been recognized by the server 22 at 54, the server 22 continues to monitor the event at 50 and 54 based on any communications from the portable subscriber device 30 and the data received from the media capture devices 32.

On the other hand, when the server 22 determines at 54 that an interesting incident has occurred, the server prepares media representing the portion of the event that includes the interesting incident at 56.

The server 22 may use additional criteria prior to preparing the media at 56. For example, in some embodiments, the server 22 first determines whether the event attendee's view was potentially obstructed before preparing the media at 56. The server 22 in such embodiments uses information regarding a current position of the portable subscriber device 30 to determine whether the event attendee was in a position where observing the interesting incident was not possible. In some embodiments, the server 22 determines whether a current position of the portable subscriber device 30 is the same as a location of the seat assigned to the attendance credential. For example, a determined current position of the portable subscriber device 30 may indicate that the event attendee is in a restroom, moving along a concourse in the venue 34, in a position with a known obstruction, or outside the venue 34 within the vicinity 48. If any of those conditions exist, the server 22 automatically determines that the event attendee is likely to desire to observe media representing the interesting incident and prepares the media at 56. Known techniques for locating a mobile station or wireless communication device are useful to determine the current location of the event attendee or portable subscriber device 30.

In some embodiments, the server 22 only prepares the media at 56 in response to a request from the event attendee.

The server 22 is configured to provide options to the event attendee to customize the media prepared at 56 regardless of whether the event attendee makes a request to receive media representing the interesting incident. Similar to that which was described above, the event attendee may select a particular interesting incident or a particular vantage point from which to observe the interesting incident on the portable subscriber device 30.

Additionally, the server 22 in some embodiments allows the event attendee to select from video, audio or still image media representing the interesting occurrence. This allows the event attendee to view a still image at the exact moment that is of interest to the event attendee, such as the instant during a batter's swing when the bat contacts a pitched baseball that resulted in a spectacular home run or a photo finish at a horse racing event.

Once the media is prepared at 52 or 56, the server 22 delivers or provides the media at 46 (FIG. 2) through the communication node 28 to the portable subscriber device 30. The media may be, as mentioned above, data that is observable as media on the portable subscriber device 30, which may include visual content, audio content, or a combination of both. In many embodiments, unless the event attendee requests a particular media format, the server 22 provides video media that includes a visible and audible representation of the portion of the event.

In some embodiments, the server 22 makes the media provided at 46 available for a limited time during or following conclusion of the event. In some embodiments, the portable subscriber device 30 has to be within a predetermined distance or range of the venue 34, such as the vicinity 48, for the provided media to be accessible to the event attendee. The server 22 may also place limits on how many times the event attendee can observe media representing the portion of the event.

The disclosed example embodiment enhances an event attendee's experience at an event and prevents the event attendee from missing portions of the event that otherwise could not have been directly observed or experienced by an individual or group attending the event.

The disclosed example embodiment is useful for a variety of events beyond those mentioned above. Example event categories for which the disclosed example embodiment is useful include competitive sports, concerts, theatrical productions or performances, conferences, programming behind a paywall (e.g., pay-per-view or subscription), and movies.

The preceding description is exemplary rather than limiting in nature. Variations and modifications to the disclosed example embodiment and scenarios may become apparent to those skilled in the art that do not necessarily depart from the essence of this invention. The scope of legal protection given to this invention can only be determined by studying the following claims.

We claim:

1. A method, comprising:
   determining that at least one first condition is satisfied indicating that a subscriber is an event attendee;
   determining that at least one second condition is satisfied indicating that the subscriber is at least likely to desire observing media representing at least a portion of the event; and
   providing the media representing at least the portion of the event to a portable subscriber device based on the first condition and the second condition being satisfied;
   wherein determining the at least one second condition is satisfied comprises:
   determining that the subscriber is not in a reserved seat for the event by determining that a current location of the subscriber or the portable subscriber device is different than a location of the reserved seat; and
   wherein the current location is within a venue hosting the event.

2. The method of claim 1, wherein determining that the at least one first condition is satisfied comprises at least one of
   determining that the subscriber has an attendance credential,
   receiving an indication that the subscriber has an attendance credential, or
   determining that the subscriber or the portable subscriber device is located within a predetermined distance of a venue hosting the event.

3. The method of claim 2, wherein the event is one of a plurality of events in a season and determining that the at least one first condition is satisfied comprises determining that the subscriber is a season ticket holder.

4. The method of claim 1, wherein the second condition includes a current time being during the event, within a predetermined pre-event window of time, or within a predetermined post-event window of time.

5. The method of claim 1, wherein providing the media representing at least the portion of the event comprises at least one of
   streaming the media during a time when the second condition is satisfied, or
   providing a segment of media corresponding to an interesting incident that occurred during the time when the second condition is satisfied.

6. The method of claim 1, comprising presenting the subscriber with a selection that allows the subscriber to select at least one of
   a plurality of media respectively representing a plurality of incidents that occurred during the event, or
   media representing each of a plurality of viewpoints from which to observe the portion of the event, or
   media representing each of a plurality of pre-planned incidents that are part of the event prior to the incidents occurring.

7. A system, comprising:
   a server including at least one processor and memory associated with the processor, the server being configured to
   determine that at least one first condition is satisfied indicating that a subscriber is an event attendee,
   determine that at least one second condition is satisfied indicating that the subscriber is at least likely to desire observing media representing at least a portion of the event, and
   prepare the media representing at least the portion of the event to be provided to a portable subscriber device based on the first condition and the second condition being satisfied;
   wherein the server is configured to determine that the at least one second condition is satisfied by determining that the subscriber is not in a reserved seat for the event, which comprises determining that a current location of the subscriber or the portable subscriber device is different than a location of the reserved seat; and
   wherein the current location is within a venue hosting the event.

8. The system of claim 7, wherein the server is configured to determine that the at least one first condition is satisfied by at least one of
   determining that the subscriber has an attendance credential,
   receiving an indication that the subscriber has an attendance credential, or
   determining that the subscriber or the portable subscriber device is located within a predetermined distance of a venue hosting the event.

9. The system of claim 8, wherein the event is one of a plurality of events in a season and the server is configured to determine that the at least one first condition is satisfied by determining that the subscriber is a season ticket holder.

10. The system of claim 7, wherein the second condition includes a current time being during the event, within a predetermined pre-event window of time, or within a predetermined post-event window of time.

11. The system of claim 7, comprising at least one communication node and wherein the server is configured to provide the media representing at least the portion of the event through the at least one communication node by at least one of
    streaming the media during a time when the second condition is satisfied, or
    providing a segment of media corresponding to an interesting incident that occurred during the time when the second condition is satisfied.

12. The system of claim 7, wherein the server is configured to present the subscriber with a selection that allows the subscriber to select at least one of
    a plurality of media respectively representing a plurality of incidents that occurred during the event, or
    media representing each of a plurality of viewpoints from which to observe the portion of the event, or
    media representing each of a plurality of pre-planned incidents that are part of the event prior to the incidents occurring.

* * * * *